United States Patent [19]
Chu

[11] Patent Number: 6,049,271
[45] Date of Patent: Apr. 11, 2000

[54] VEHICLE REARVIEW MIRROR WITH MULTIPLE SIGNAL MEANS

[76] Inventor: Ching-Ti Chu, No. 21, Lane 44, Tatung N. Rd., Taipei City, Taipei County, Taiwan

[21] Appl. No.: 09/342,209

[22] Filed: Jun. 29, 1999

[51] Int. Cl.[7] ...................................................... B60Q 1/22
[52] U.S. Cl. .......................... 340/463; 340/466; 340/471; 340/475; 362/473; 362/494
[58] Field of Search ..................................... 362/473, 494, 362/543, 544, 549; 340/463, 464, 465, 466, 468, 471, 472, 475

[56] References Cited

U.S. PATENT DOCUMENTS

| | | | |
|---|---|---|---|
| 5,016,996 | 5/1991 | Ueno | 362/494 |
| 5,499,169 | 3/1996 | Chen | 362/494 |
| 5,660,457 | 8/1997 | Lyons | 362/494 |
| 5,774,283 | 6/1998 | Nagel et al. | 340/447 |

*Primary Examiner*—Daniel J. Wu
*Assistant Examiner*—Anh La
*Attorney, Agent, or Firm*—Rosenberg, Klein & Lee

[57] ABSTRACT

A vehicle rearview mirror, which includes a casing, the casing having a front mirror for reflecting the image of traffic approaching from behind, a rectangular back opening at a back side wall thereof, a corner opening at a rear corner thereof remote from the motor vehicle in which the vehicle rearview mirror is installed, a substantially U-shaped holder frame at a top side wall thereof, and power contacts provided at the top side wall within the U-shaped holder frame and connected to the battery power supply circuit of the motor vehicle, a speeding signal lamp installed in the rectangular back opening in the casing and electrically connected to the battery power supply circuit of the motor vehicle, a turn signal lamp installed in the corner opening in the casing and electrically connected to the battery power supply circuit of the motor vehicle, and a warning signal lamp, which can be a rotary warning signal lamp or a flashing signal lamp, installed in the U-shaped holder frame at the casing and disposed in contact with the power contacts at the casing.

4 Claims, 3 Drawing Sheets

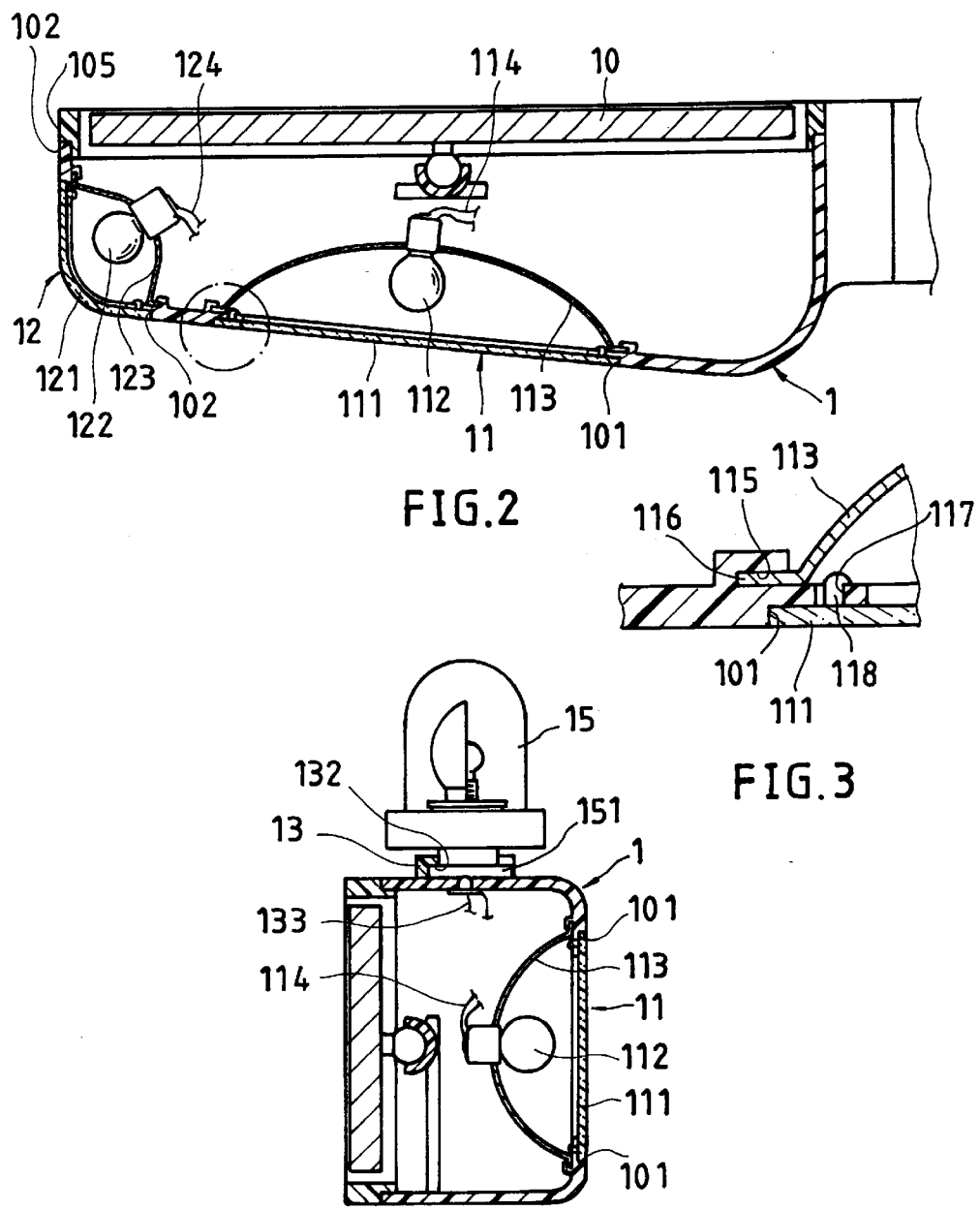

6,049,271

VEHICLE REARVIEW MIRROR WITH MULTIPLE SIGNAL MEANS

BACKGROUND OF THE INVENTION

The present invention relates to a vehicle rearview mirror, and more particularly to such a vehicle rearview mirror which is equipped with a speeding signal lamp, a turn signal lamp, and a warning signal lamp.

A regular vehicle rearview mirror is designed to be placed on a motor vehicle so that the driver can see traffic approaching from behind. While a motor vehicle fails, the driver may put a triangle sign at a distance behind the motor vehicle to warn traffic approaching from behind. Because a triangle sign simply reflects light, it does no work when receives no light.

SUMMARY OF THE INVENTION

The present invention has been accomplished under the circumstances in view. According to one aspect of the present invention, the vehicle rear view mirror comprises a casing, the casing having a front mirror for reflecting the image of traffic approaching from behind, a rectangular back opening at a back side wall thereof, a corner opening at a rear corner thereof remote from the motor vehicle in which the vehicle rearview mirror is installed, a substantially U-shaped holder frame at a top side wall thereof, and power contacts provided at the top side wall within the U-shaped holder frame and connected to the battery power supply circuit of the motor vehicle, a speeding signal lamp installed in the rectangular back opening in the casing and electrically connected to the battery power supply circuit of the motor vehicle, a turn signal lamp installed in the corner opening in the casing and electrically connected to the battery power supply circuit of the motor vehicle, and a warning signal lamp installed in the U-shaped holder frame at the casing and disposed in contact with the power contacts at the casing. According to another aspect of the present invention, the warning signal lamp can be a rotary warning signal lamp, or a flashing signal lamp.

BRIEF DESCRIPTION OF THE DRAWINGS

FIG. 2 is a top view in section of the vehicle rearview mirror according to the present invention.

FIG. 3 is an enlarged view of a part of FIG. 2, showing the connection between the casing and the speeding signal lamp.

FIG. 4 is a side view in section of the vehicle rearview mirror according to the present invention.

DETAILED DESCRIPTION OF THE PREFERRED EMBODIMENT

Figure 1:
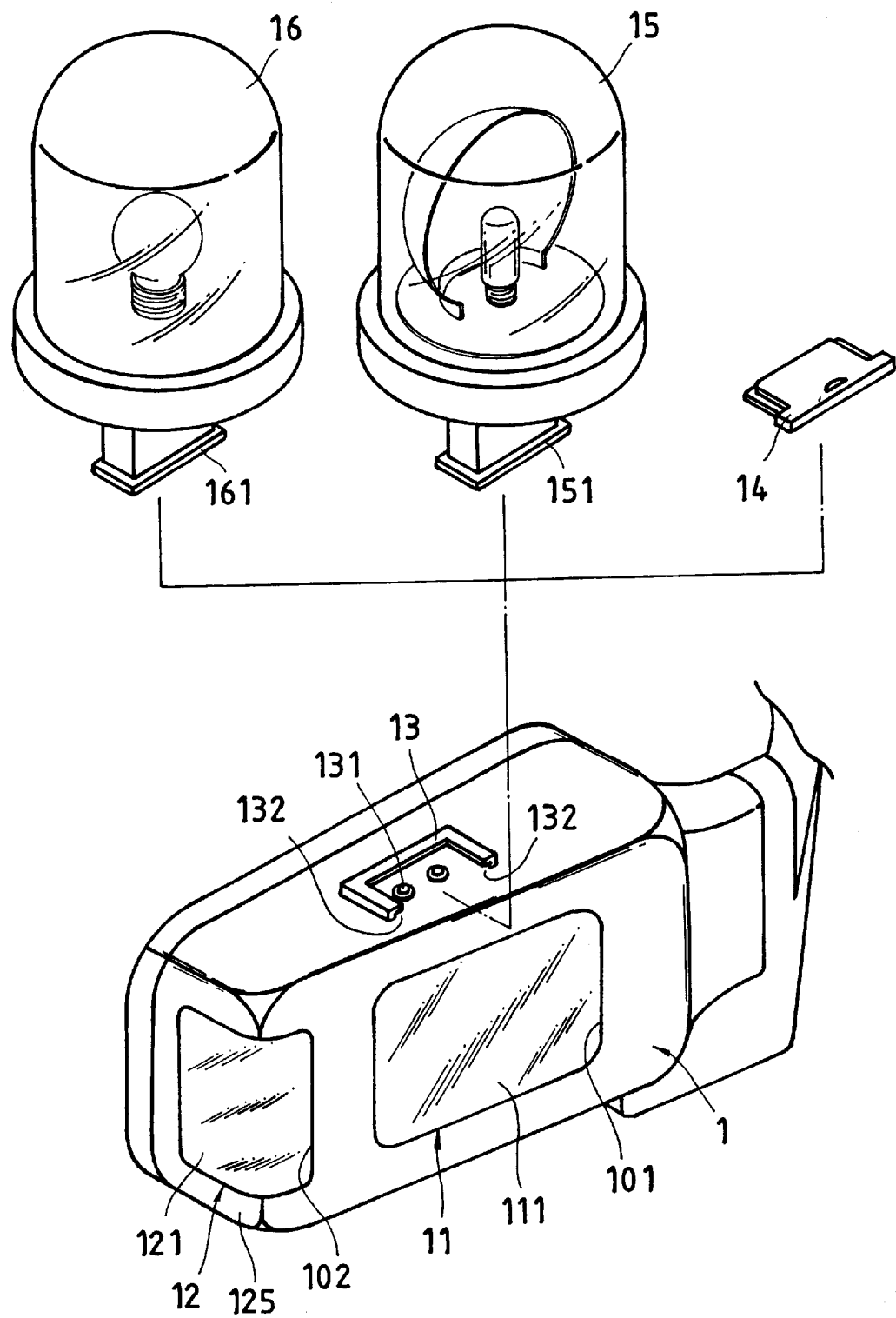
FIG. 1 is an exploded view of a vehicle rearview mirror according to the present invention.

Referring to FIGS. from 1 through 4, a vehicle rearview mirror is shown comprised of a casing 1, a speeding signal lamp 11, a turn signal lamp 12, and a warning signal lamp 15 or 16. The casing 1 comprises a mirror 10 at a front side wall thereof for reflecting the image of traffic approaching from behind, a rectangular back opening 101 at a back side wall thereof, a corner opening 102 at a rear corner 125 thereof remote from the motor vehicle in which the vehicle rearview mirror is installed, a substantially U-shaped holder frame 13 provided at a top side wall thereof and defining a coupling groove 132 for holding the warning signal lamp 15 or 16, positive and negative power contacts 131 provided at the top side wall and surrounded by the U-shaped holder frame 13, and an electric wire 133 extended from the positive and negative power contacts 131 and connected the battery power supply circuit of the motor vehicle in which the vehicle rearview mirror is installed. The speeding signal lamp 11 is installed in the rectangular back opening 101 inside the casing 1, comprising a lens 111 covered on the rectangular back opening 101, a lamp bulb 112 mounted inside the casing 1 and controlled to emit light through the lens 111, an electric wire 114 extended from the lamp bulb 112 and connected to the battery power supply circuit of the motor vehicle, and a reflector 113 covered around the lamp bulb 112 to reflect light from the lamp bulb 112 toward the lens 111. The turn signal lamp 12 is installed in the corner opening 102 inside the casing 1, comprising a lens 121 covered on the corner opening 102, a lamp bulb 122 mounted inside the casing 1 and controlled to emit light through the lens 121, an electric wire 124 extended from the lamp bulb 122 and connected to the battery power supply circuit of the motor vehicle, and a reflector 123 covered around the lamp bulb 122 to reflect light from the lamp bulb 122 toward the lens 121.

The aforesaid warning signal lamp can be a rotary signal lamp 15, or flashing signal lamp 16. The warning signal lamp 15 or 16 comprises a power connector 151 or 161 at the bottom side for connection to the U-shaped holder frame 13. By inserting the power connector 151 or 161 into the coupling groove 132 in the U-shaped holder frame 13, the positive and negative power contacts (not shown) of the power connector 151 or 161 are respectively forced into contact with the positive and negative power contacts 131 at the casing 1, enabling the warning signal lamp 15 or 16 to be electrically connected to the battery power supply circuit of the motor vehicle.

When in use, the rotary warning signal lamp 15 or the flashing signal lamp 16 can be installed in the U-shaped holder frame 13. If no warning signal lamp is used, a cover plate 14 is inserted into the coupling groove 132 to keep the positive and negative power contacts 131 from sight, and to protect the positive and negative power contacts 131.

Referring to FIGS. 2 and 3 again, the casing 1 comprises a coupling flange 116 raised from the inside wall thereof around the rectangular back opening 101, and a plurality of plug holes 117 at a recessed portion at the back side wall around the rectangular back opening 101. The reflector 113 of the speeding signal lamp 11 has a peripheral coupling flange 115 forced into engagement with the coupling flange 166 inside the casing 1. The lens 111 of the speeding signal lamp 11 comprises a plurality of backward plugs 118 raised from the back side wall thereof around the border area, and respectively plugged into the plug holes 117 at the back side wall of the casing 1. When installed, the lens 111 is maintained in flush with the back side wall of the casing 1.

Figure 5:
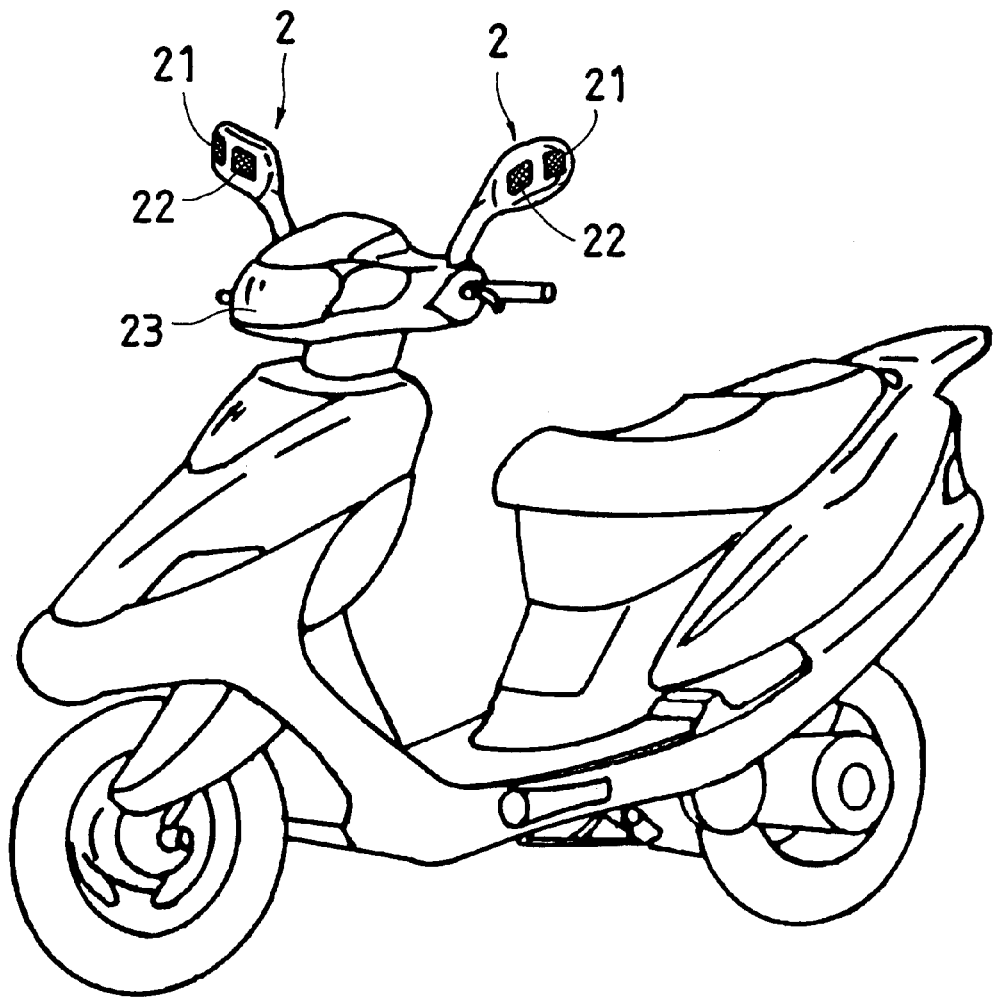
FIG. 5 illustrates an application example of the present invention, showing two rearview mirrors installed in the head of a motorcycle.

FIG. 5 shows two vehicle rearview mirrors 2 installed in the head 23 of the motorcycle. The vehicle rearview mirrors 2 each comprise a turn signal lamp 21, and a speeding signal lamp 22.

It is to be understood that the drawings are designed for purposes of illustration only, and are not intended as a definition of the limits and scope of the invention disclosed.

What the invention claimed is:

1. A vehicle rearview mirror comprising:
   a rearview mirror body formed of a casing and a mirror at a front side of said casing and installed in a motor vehicle so that the driver can see traffic approaching from behind, said casing comprising a rectangular back opening at a back side wall thereof opposite to said mirror, a corner opening at a rear corner thereof remote from the motor vehicle in which the vehicle rearview mirror is installed, a substantially U-shaped holder frame provided at a top side wall thereof and defining a coupling groove, positive and negative power contacts provided at the top side wall and surrounded by said U-shaped holder frame, and an electric wire extended from said positive and negative power contacts and connected the battery power supply circuit of the motor vehicle in which the vehicle rearview mirror is installed;

a speeding signal lamp installed in the rectangular back opening in said casing;

a turn signal lamp installed in the corner opening in said casing; and a removable warning signal lamp be installed in said U-shaped holder frame at said casing, said warning signal lamp comprising a power connector inserted into the coupling groove in said U-shaped holder frame and electrically connected to the positive and negative power contacts at said casing.

2. The vehicle rearview mirror of claim 1 wherein said casing comprises a coupling flange raised from an inside wall thereof around said rectangular back opening, and a plurality of plug holes at a recessed portion at the back side wall around said rectangular back opening; said speeding signal lamp comprises a lens fitted into the recessed portion at the back side wall of said casing and covered on said rectangular back opening, said lens having a plurality of backward plugs respectively plugged into the plug holes at the back side wall of said casing, a lamp bulb mounted inside said casing and controlled to emit light through said lens, an electric wire extended from said lamp bulb and connected to the battery power supply circuit of the motor vehicle in which the vehicle rearview mirror is installed, and a reflector covered around said lamp bulb to reflect light from said lamp bulb toward said lens.

3. The vehicle rearview mirror of claim 1 wherein said warning signal lamp is a rotary warning signal lamp.

4. The vehicle rearview mirror of claim 1 wherein said warning signal lamp is a flashing signal lamp.

* * * * *